(12) United States Patent
Ozturk et al.

(10) Patent No.: US 11,849,500 B2
(45) Date of Patent: Dec. 19, 2023

(54) FLEXIBLE DISCONTINUOUS RECEPTION CONFIGURATION

(71) Applicant: QUALCOMM Incorporated, San Diego, CA (US)

(72) Inventors: Ozcan Ozturk, San Diego, CA (US); Gavin Bernard Horn, La Jolla, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/226,949

(22) Filed: Apr. 9, 2021

(65) Prior Publication Data

US 2021/0321481 A1    Oct. 14, 2021

Related U.S. Application Data

(60) Provisional application No. 63/009,335, filed on Apr. 13, 2020.

(51) Int. Cl.
*H04W 72/04* (2023.01)
*H04W 76/28* (2018.01)
(Continued)

(52) U.S. Cl.
CPC ........... *H04W 76/28* (2018.02); *H04L 1/1614* (2013.01); *H04W 72/0446* (2013.01); *H04W 72/23* (2023.01); *H04W 76/11* (2018.02)

(58) Field of Classification Search
CPC ........... H04W 72/042; H04W 72/0446; H04W 52/0216; H04W 76/28; H04W 76/11;
(Continued)

(56) References Cited

U.S. PATENT DOCUMENTS 8,358,982 B2 *   1/2013   Van Der Velde ........................... H04W 36/0088
                                                                    455/67.11
2012/0188988 A1 *   7/2012   Chung ................. H04B 1/7073
                                                                    370/335

(Continued)

FOREIGN PATENT DOCUMENTS

EP          3771257 A1    1/2021
WO    WO-2019190205 A1   10/2019
(Continued)

OTHER PUBLICATIONS

International Search Report and Written Opinion—PCT/US2021/070378—ISA/EPO—dated Jul. 13, 2021.

*Primary Examiner* — Wei Zhao
(74) *Attorney, Agent, or Firm* — QUALCOMM Incorporated

(57) ABSTRACT

Various aspects of the present disclosure generally relate to wireless communication. In some aspects, a user equipment may receive discontinuous reception (DRX) configuration information identifying a slot or sub-slot granularity for transitioning from a non-monitoring state to a monitoring state, wherein the information identifies, for each slot or sub-slot, whether to operate in the non-monitoring state or the monitoring state; and transition from the non-monitoring state, wherein the user equipment (UE) is not performing monitoring, to the monitoring state, wherein the UE is performing monitoring, in accordance with the DRX configuration information. Numerous other aspects are provided.

30 Claims, 7 Drawing Sheets

(51) Int. Cl.
*H04W 72/0446* (2023.01)
*H04L 1/1607* (2023.01)
*H04W 76/11* (2018.01)
*H04W 72/23* (2023.01)

(58) Field of Classification Search
CPC .... H04W 72/044; H04L 1/1614; H04L 1/161; H04L 5/0051; H04L 5/0032
See application file for complete search history.

(56) References Cited

U.S. PATENT DOCUMENTS

| | | | |
|---|---|---|---|
| 2014/0185530 A1* | 7/2014 | Kuchibhotla | H04W 72/0446 370/329 |
| 2018/0184246 A1* | 6/2018 | Ryu | H04W 68/06 |
| 2020/0037248 A1* | 1/2020 | Zhou | H04B 7/022 |
| 2022/0159574 A1* | 5/2022 | Islam | H04W 52/0219 |

FOREIGN PATENT DOCUMENTS

| WO | WO-2020041421 A1 | 2/2020 |
|---|---|---|
| WO | WO-2020060890 A1 | 3/2020 |

\* cited by examiner

US 11,849,500 B2

FLEXIBLE DISCONTINUOUS RECEPTION CONFIGURATION

CROSS-REFERENCE TO RELATED APPLICATION

This patent application claims priority to U.S. Provisional Patent Application No. 63/009,335, filed on Apr. 13, 2020, entitled "FLEXIBLE DISCONTINUOUS RECEPTION CONFIGURATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for flexible discontinuous reception (DRX) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving discontinuous reception (DRX) configuration information identifying a slot or sub-slot granularity for transitioning from a non-monitoring state to a monitoring state, wherein the information identifies, for each slot or sub-slot, whether to operate in the non-monitoring state or the monitoring state; and transitioning from the non-monitoring state, wherein the UE is not performing monitoring, to the monitoring state wherein the UE is performing monitoring, in accordance with the DRX configuration information.

In some aspects, a UE for wireless communication may include a memory and one or more processors operatively coupled to the memory. The memory and the one or more processors may be configured to receive DRX configuration information identifying a slot or sub-slot granularity for transitioning from a non-monitoring state to a monitoring state, wherein the information identifies, for each slot or sub-slot, whether to operate in the non-monitoring state or the monitoring state; and transition from the non-monitoring state, wherein the UE is not performing monitoring, to the monitoring state wherein the UE is performing monitoring, in accordance with the DRX configuration information.

In some aspects, a non-transitory computer-readable medium may store one or more instructions for wireless communication. The one or more instructions, when executed by one or more processors of a UE, may cause the one or more processors to receive DRX configuration information identifying a slot or sub-slot granularity for transitioning from a non-monitoring state to a monitoring state, wherein the information identifies, for each slot or sub-slot, whether to operate in the non-monitoring state or the monitoring state; and transition from the non-monitoring state, wherein the UE is not performing monitoring, to the monitoring state wherein the UE is performing monitoring, in accordance with the DRX configuration information.

In some aspects, an apparatus for wireless communication may include means for receiving DRX configuration information identifying a slot or sub-slot granularity for transitioning from a non-monitoring state to a monitoring state, wherein the information identifies, for each slot or sub-slot, whether to operate in the non-monitoring state or the monitoring state; and means for transitioning from the non-monitoring state, wherein the apparatus is not performing monitoring, to the monitoring state wherein the apparatus is performing monitoring, in accordance with the DRX configuration information.

In some aspects, a method of wireless communication performed by a base station includes transmitting DRX configuration information identifying a slot or sub-slot granularity for a UE transition from a non-monitoring state to a monitoring state, wherein the information identifies, for each slot or sub-slot, whether a UE is to operate in a non-monitoring state or a monitoring state; and transmitting signaling to the UE in accordance with the DRX configuration information.

In some aspects, a base station for wireless communication includes a memory; and one or more processors, coupled to the memory, configured to: transmit DRX configuration information identifying a slot or sub-slot granularity for a UE transition from a non-monitoring state to a monitoring state, wherein the information identifies, for each slot or sub-slot, whether a UE is to operate in a non-monitoring state or a monitoring state; and transmit signaling to the UE in accordance with the DRX configuration information.

In some aspects, a non-transitory computer-readable medium may store one or more instructions for wireless communication. The one or more instructions, when executed by one or more processors of a base station, may cause the one or more processors to transmit DRX configuration information identifying a slot or sub-slot granularity for a UE transition from a non-monitoring state to a monitoring state, wherein the information identifies, for each slot or sub-slot, whether a UE is to operate in a non-monitoring state or a monitoring state; and transmit signaling to the UE in accordance with the DRX configuration information.

In some aspects, an apparatus for wireless communication may include means for transmitting DRX configuration information identifying a slot or sub-slot granularity for a UE transition from a non-monitoring state to a monitoring state, wherein the information identifies, for each slot or sub-slot, whether a UE is to operate in a non-monitoring state or a monitoring state; and means for transmitting signaling to the UE in accordance with the DRX configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
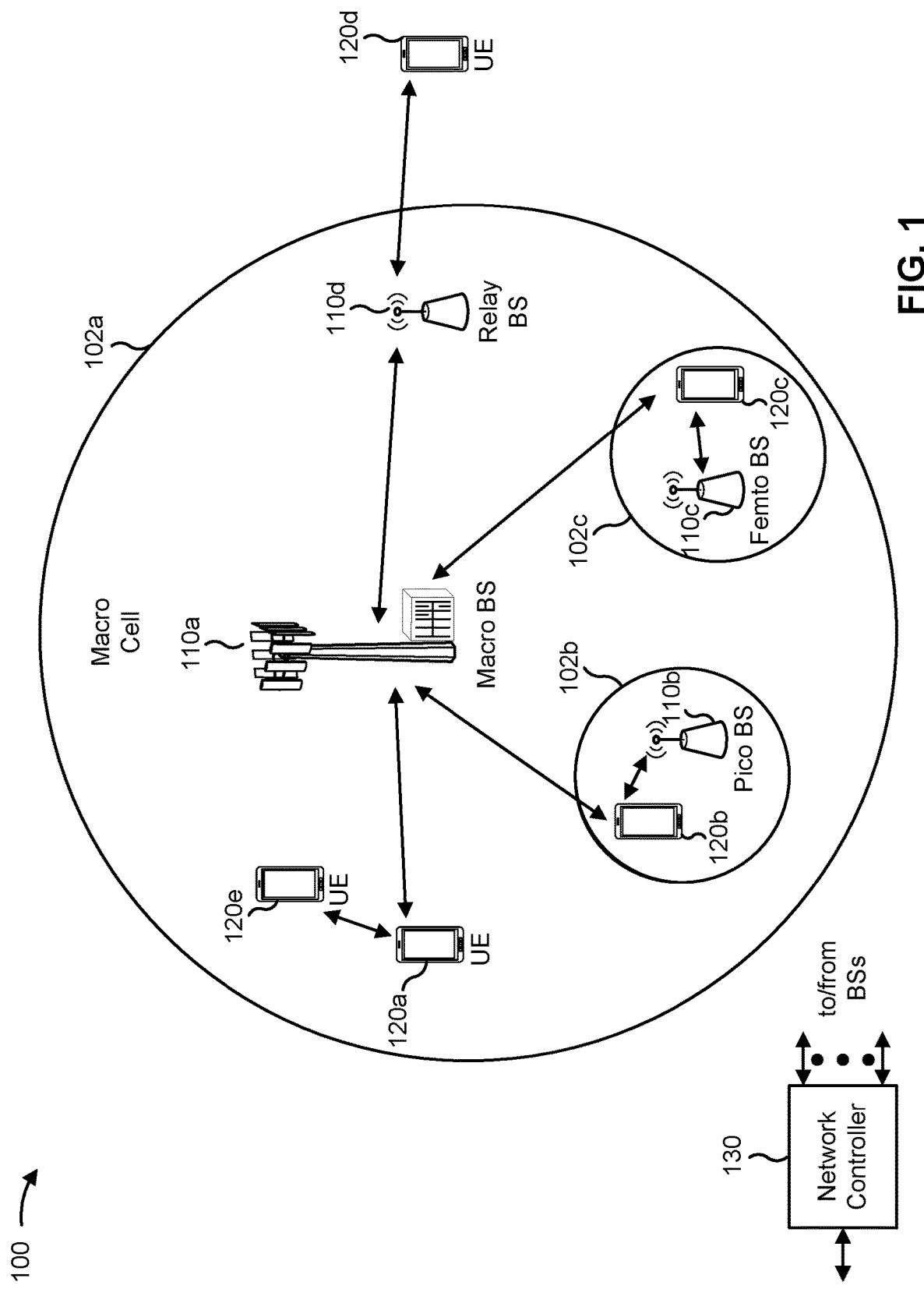
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
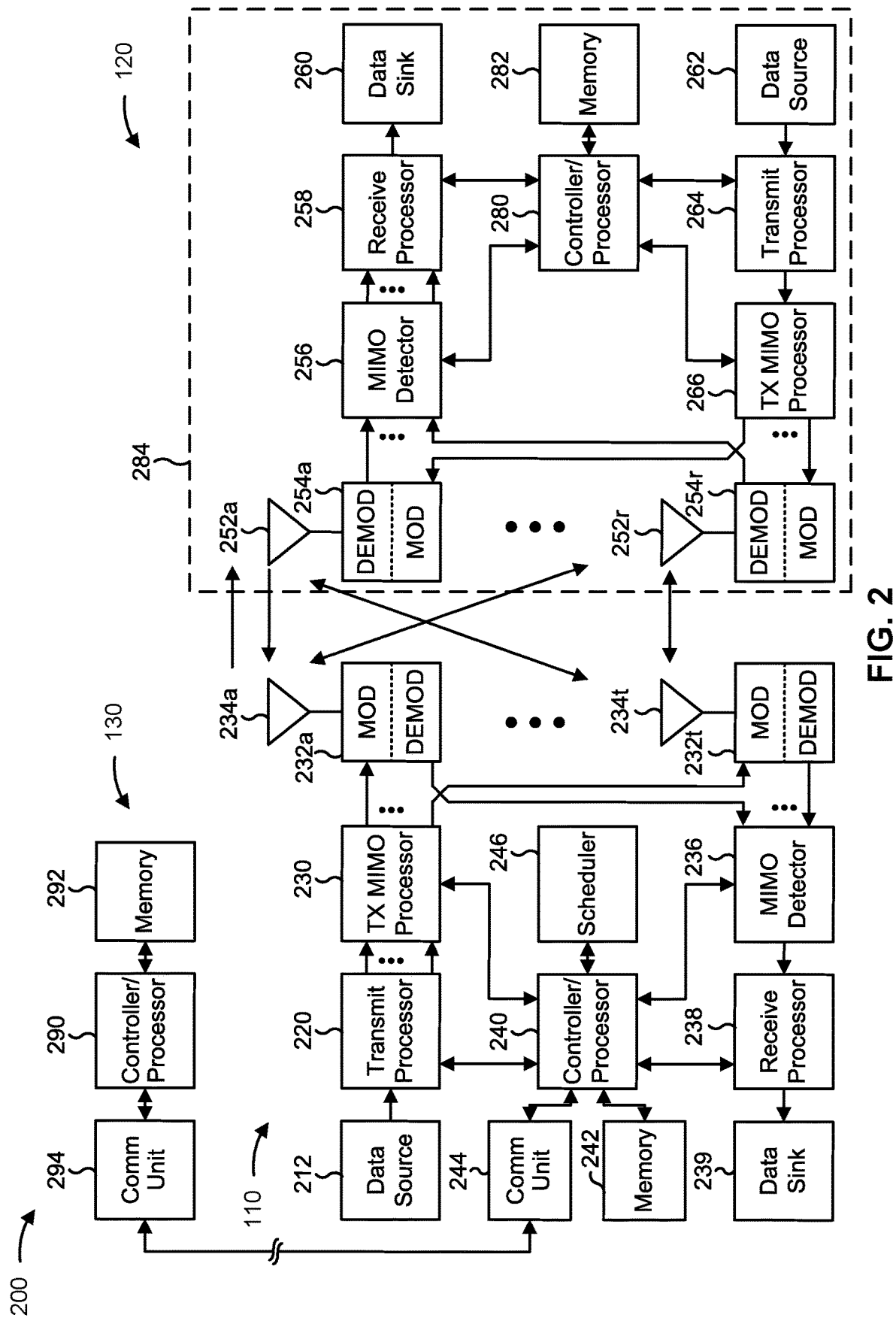
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with flexible discontinuous reception (DRX) configuration, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a UE includes means for receiving DRX configuration information identifying a slot or sub-slot granularity for transitioning from a non-monitoring state to a monitoring state, wherein the information identifies, for each slot or sub-slot, whether to operate in the non-monitoring state or the monitoring state; or means for transitioning from the non-monitoring state, wherein the UE is not performing monitoring, to the monitoring state wherein the UE is performing monitoring, in accordance with the DRX configuration information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving, based at least in part on monitoring a physical downlink control channel in accordance with the DRX configuration, a downlink control information; or means for starting an inactivity timer associated with controlling whether to monitor for downlink data.

In some aspects, the UE includes means for receiving an explicit indication of whether to receive downlink data in connection with the DRX configuration.

In some aspects, the UE includes means for receiving a wake-up signal; or means for transitioning from the non-monitoring state to the monitoring state in accordance with the DRX configuration information based at least in part on receiving the wake-up signal.

In some aspects, the UE includes means for receiving a channel access indication for shared spectrum; or means for activating a DRX configuration of the DRX configuration information based at least in part on receiving the channel access indication.

In some aspects, the UE includes means for operating in accordance with a default configuration until receipt of the channel access indication.

In some aspects, a base station includes means for transmitting DRX configuration information identifying a slot or sub-slot granularity for a UE transition from a non-monitoring state to a monitoring state, wherein the information identifies, for each slot or sub-slot, whether a UE is to operate in a non-monitoring state or a monitoring state; or means for transmitting signaling to the UE in accordance with the DRX configuration information. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting an explicit indication of whether to the UE is to receive downlink data in connection with the DRX configuration.

In some aspects, the base station includes means for transmitting a wake-up signal indicating the UE transition from the non-monitoring state to the monitoring state in accordance with the DRX configuration information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, UEs may enter a power saving mode, such as a DRX mode. In the DRX mode, the UE may periodically switch from a monitoring state (e.g., a DRX awake state), in which the UE monitors for downlink communications, to a non-monitoring state (e.g., a DRX sleep state, a low-power mode, and/or the like), in which the UE forgoes monitoring for downlink communications. The downlink communications may include, for example, a physical downlink control channel (PDCCH). By forgoing monitoring for the PDCCH during certain periods (e.g., when a BS is not transmitting the PDCCH), the UE reduces a utilization of power resources.

The DRX mode may be associated with a fixed, periodic cycle, whereby the UE transitions between the monitoring state and the non-monitoring state at fixed, periodically occurring occasions. When the UE detects data (e.g., a PDCCH), the UE and the BS may communicate one or more messages to enable an extension of the monitoring state to enable the UE to receive communications from the BS. The granularity for the DRX mode may be an integer multiple of 1 millisecond (ms) and/or may be specified on a whole slot basis. However, for some use cases, such as industrial IoT use cases, extended reality use cases, and/or the like, integer multiples of 1 ms and transitions only at whole slots may be unsuitable, resulting in excessive utilization of power resources or power communication latency.

Some aspects described herein enable flexible DRX configuration. For example, a UE may receive information identifying one or more DRX configurations in which each DRX configuration identifies whether to operate in a non-monitoring state or a monitoring state at a sub-slot level. In this way, the UE may achieve fractional millisecond granularities and/or sub-slot granularities, which may enable some use cases for which integer millisecond granularities are unsuitable. Moreover, based at least in part on increasing a granularity with which the UE uses a DRX mode, the BS and the UE may achieve further reductions in a utilization of power resources, relative to less granular uses of the DRX mode.

Figure 3:
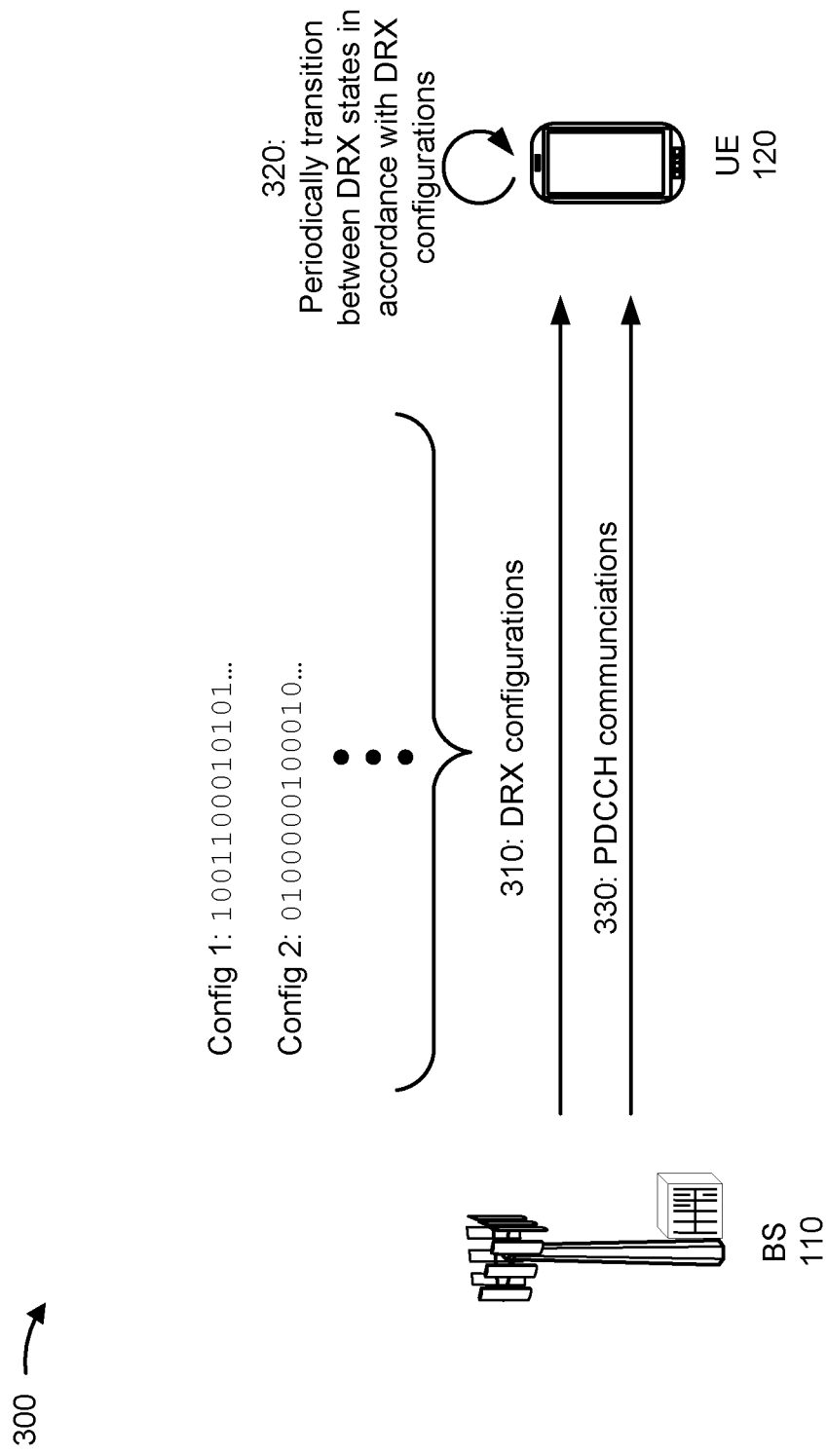
FIG. 3 is a diagram illustrating an example associated with flexible discontinuous reception (DRX) configuration, in accordance with the present disclosure.

FIG. 3 is a diagram illustrating an example 300 of flexible DRX configuration, in accordance with various aspects of the present disclosure. As shown in FIG. 3, example 300 includes a BS 110 and a UE 120. Although some aspects are described herein in terms of an access network with a UE and a BS, other configurations are contemplated, such as sidelink configurations, V2X configurations, integrated access and backhauling (IAB)-node configurations, and/or the like.

As further shown in FIG. 3, and by reference number 310, UE 120 may receive information identifying one or more DRX configurations for a DRX mode (e.g., a connected DRX mode, an idle DRX mode, and/or the like). For example, UE 120 may receive signaling from BS 110 identifying a DRX configuration. Additionally, or alternatively, UE 120 may receive signaling from one or more BSs 110 identifying a plurality of DRX configurations. For example, UE 120 may receive a first DRX configuration for a first bandwidth part and a second DRX configuration for a second bandwidth part. Additionally, or alternatively, UE 120 may receive a first DRX configuration for communication with a first serving cell and a second DRX configuration for communication with a second serving cell.

In some aspects, UE 120 may receive a bit map identifying a DRX configuration. For example, UE 120 may receive a bit map with a particular length and with each bit of the bit map corresponding to a different slot or sub-slot. In this case, the particular length may correspond to a granularity of a DRX cycle associated with the DRX configuration. In this way, UE 120 may interpret bits of the bit map to determine whether to operate in a first DRX state (e.g., a '0' may indicate a non-monitoring state), a second DRX state (e.g., a '1' may indicate a monitoring state), and/or the like in one or more slots or sub-slots of a DRX cycle. Although some aspects are described in terms of a particular set of indicator values and/or states, other indicator values and/or states are contemplated.

In some aspects, UE 120 may receive the bit map via radio resource control (RRC) signaling. For example, UE 120 may receive RRC signaling during connected mode operation to configure DRX mode operation. Additionally, or alternatively, UE 120 may receive the bit map via a system information block (SIB) message in an idle mode or an inactive mode. In some aspects, the bit map may be associated with an offset indicator, which may indicate when a DRX state transition pattern identified by the bit map is to start.

In some aspects, UE 120 may receive activation signaling indicating whether to activate a DRX configuration. For example, UE 120 may receive, via a PDCCH or a medium access control (MAC) control element (CE), signaling associated with selecting from a plurality of received DRX configurations. In this case, UE 120 may operate in a default configuration prior to receiving the activation signaling. For example, UE 120 may periodically transition to the monitoring state in accordance with the default configuration to attempt to receive activation signaling (e.g., via a PDCCH). Additionally, or alternatively, UE 120 may activate the DRX configuration based at least in part on receiving a wake-up signal. For example, UE 120 may receive wake-up signaling and may activate a DRX configuration (e.g., to start after a configured offset period). Additionally, or alternatively, UE 120 may activate the DRX configuration based at least in part on receiving a channel access indication. For example, in shared spectrum deployments, UE 120 may receive a channel occupancy time (COT) scheduling information (COT-SI) (e.g., in a downlink control information (DCI) message separate from signaling including the DRX configuration) and may activate a DRX configuration based at least in part on receiving the COT-SI.

As further shown in FIG. 3, and by reference numbers 320 and 330, UE 120 may operate in one or more DRX states and receive one or more PDCCH communications in accordance with the one or more DRX configurations. For example, UE 120 may, at a specified sub-slot, transition from a non-monitoring state to a monitoring state and receive a PDCCH communication. Further to the example, at another sub-slot, UE 120 may return to the non-monitoring state, thereby enabling a reduction in a utilization of power resources relative to remaining the monitoring state. In some aspects, when UE 120 transitions to the monitoring state, UE 120 may monitor for a UE cell-specific radio network temporary identifier (C-RNTI). For example, in a connected DRX mode, UE 120 may use monitoring state periods to monitor for a C-RNTI. In contrast, in an idle or inactive DRX mode, UE 120 may use the monitoring state periods to monitor for a paging radio network temporary identifier (P-RNTI) or another type of radio network temporary identifier (RNTI).

In some aspects, UE 120 may monitor a particular search space. For example, when UE 120 receives a plurality of different DRX configurations identified by a plurality of different bit maps, UE 120 may identify a correspondence between the plurality of different bit maps and a plurality of search spaces. In this case, when UE 120 transitions to a monitoring state, UE 120 may monitor a search space corresponding to a bit map that triggered the transition to the monitoring state. In some aspects, UE 120 may perform monitoring for a particular duration. For example, UE 120 may receive non-access stratum (NAS) signaling (e.g., in an idle or inactive DRX mode) indicating a duration for a monitoring period triggered by an indicator of a bit map conveying a DRX configuration.

As indicated above, FIG. 3 is provided as an example. Other examples may differ from what is described with respect to FIG. 3.

Figure 4:
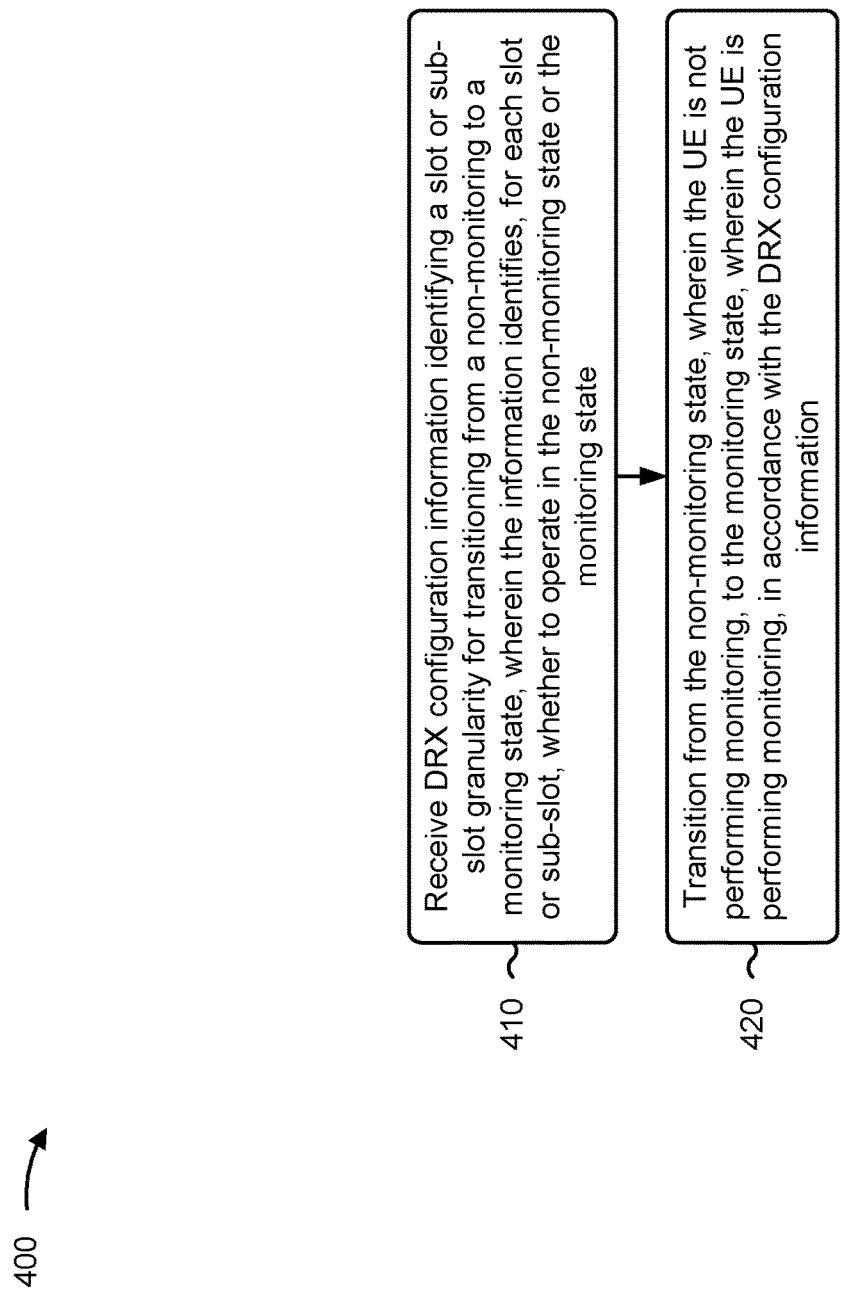
FIGS. 4-5 are diagrams illustrating example processes associated with flexible DRX configuration, in accordance with the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with flexible discontinuous reception configuration.

As shown in FIG. 4, in some aspects, process 400 may include receiving DRX configuration information identifying a slot or sub-slot granularity for transitioning from a non-monitoring state to a monitoring state, wherein the information identifies, for each slot or sub-slot, whether to operate in the non-monitoring state or the monitoring state (block 410). For example, the UE (e.g., using reception component 602, depicted in FIG. 6) may receive DRX configuration information identifying a slot or sub-slot granularity for transitioning from a non-monitoring state to a monitoring state, as described above. In some aspects, the information identifies, for each slot or sub-slot, whether to operate in the non-monitoring state or the monitoring state.

As further shown in FIG. 4, in some aspects, process 400 may include transitioning from the non-monitoring state, wherein the UE is not performing monitoring, to the monitoring state, and wherein the UE is performing monitoring, in accordance with the DRX configuration information (block 420). For example, the UE (e.g., using state transition component 608, depicted in FIG. 6) may transition from the non-monitoring state to the monitoring state in accordance with the DRX configuration information, as described above. In some aspects, the monitoring state is defined by the UE performing monitoring (e.g., of a PDCCH). In some aspects, the non-monitoring state is defined by the UE not performing monitoring (e.g., of a PDCCH).

Process 400 may include additional aspects, such as any single aspect or any combination of aspects described below and/or in connection with one or more other processes described elsewhere herein.

In a first aspect, the DRX configuration information includes information identifying a first slot or sub-slot granularity for a first serving cell or bandwidth part and a second slot or sub-slot granularity for a second serving cell or bandwidth part.

In a second aspect, alone or in combination with the first aspect, the DRX configuration includes information identifying the slot or sub-slot granularity for connected mode DRX or idle mode DRX.

In a third aspect, alone or in combination with one or more of the first and second aspects, the DRX configuration information is a bit map with a plurality of bits corresponding to a plurality of slots or sub-slots to identify the slot or sub-slot granularity.

In a fourth aspect, alone or in combination with one or more of the first through third aspects, the DRX configuration information is conveyed via at least one of a radio resource control message or a system information block message.

In a fifth aspect, alone or in combination with one or more of the first through fourth aspects, the DRX configuration information includes offset information identifying a start point for the slot or sub-slot granularity.

In a sixth aspect, alone or in combination with one or more of the first through fifth aspects, the DRX configuration information includes a bit indicator to indicate whether to monitor a PDCCH for at least one of: a cell radio network temporary identifier, a paging radio network temporary identifier, or a search space associated with a bitmap of the DRX configuration information.

In a seventh aspect, alone or in combination with one or more of the first through sixth aspects, a monitoring period is based at least in part on a non-access stratum identifier.

In an eighth aspect, alone or in combination with one or more of the first through seventh aspects, the DRX configuration information includes a plurality of bit maps activated by an activation command received in at least one of a physical downlink control channel message or a medium access control control element.

In a ninth aspect, alone or in combination with one or more of the first through eighth aspects, process 400 includes receiving, based at least in part on monitoring a physical downlink control channel in accordance with the DRX configuration, a downlink control information; and starting an inactivity timer associated with controlling whether to monitor for downlink data.

In a tenth aspect, alone or in combination with one or more of the first through ninth aspects, process 400 includes receiving an explicit indication of whether to receive downlink data in connection with the DRX configuration.

In an eleventh aspect, alone or in combination with one or more of the first through tenth aspects, transitioning from the non-monitoring state to the monitoring state in accordance with the DRX configuration information comprises: transitioning from the non-monitoring state to the monitoring state in accordance with the DRX configuration information based at least in part on receiving the wake-up signal.

In a twelfth aspect, alone or in combination with one or more of the first through eleventh aspects, process 400 includes receiving a channel access indication for shared spectrum; and activating a DRX configuration of the DRX configuration information based at least in part on receiving the channel access indication.

In a thirteenth aspect, alone or in combination with one or more of the first through twelfth aspects, process 400 includes operating in accordance with a default configuration until receipt of the channel access indication.

In a fourteenth aspect, alone or in combination with one or more of the first through thirteenth aspects, the default configuration includes one or more wake up periods.

In a fifteenth aspect, alone or in combination with one or more of the first through fourteenth aspects, the DRX configuration information includes a plurality of DRX configurations associated with a plurality of cells.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
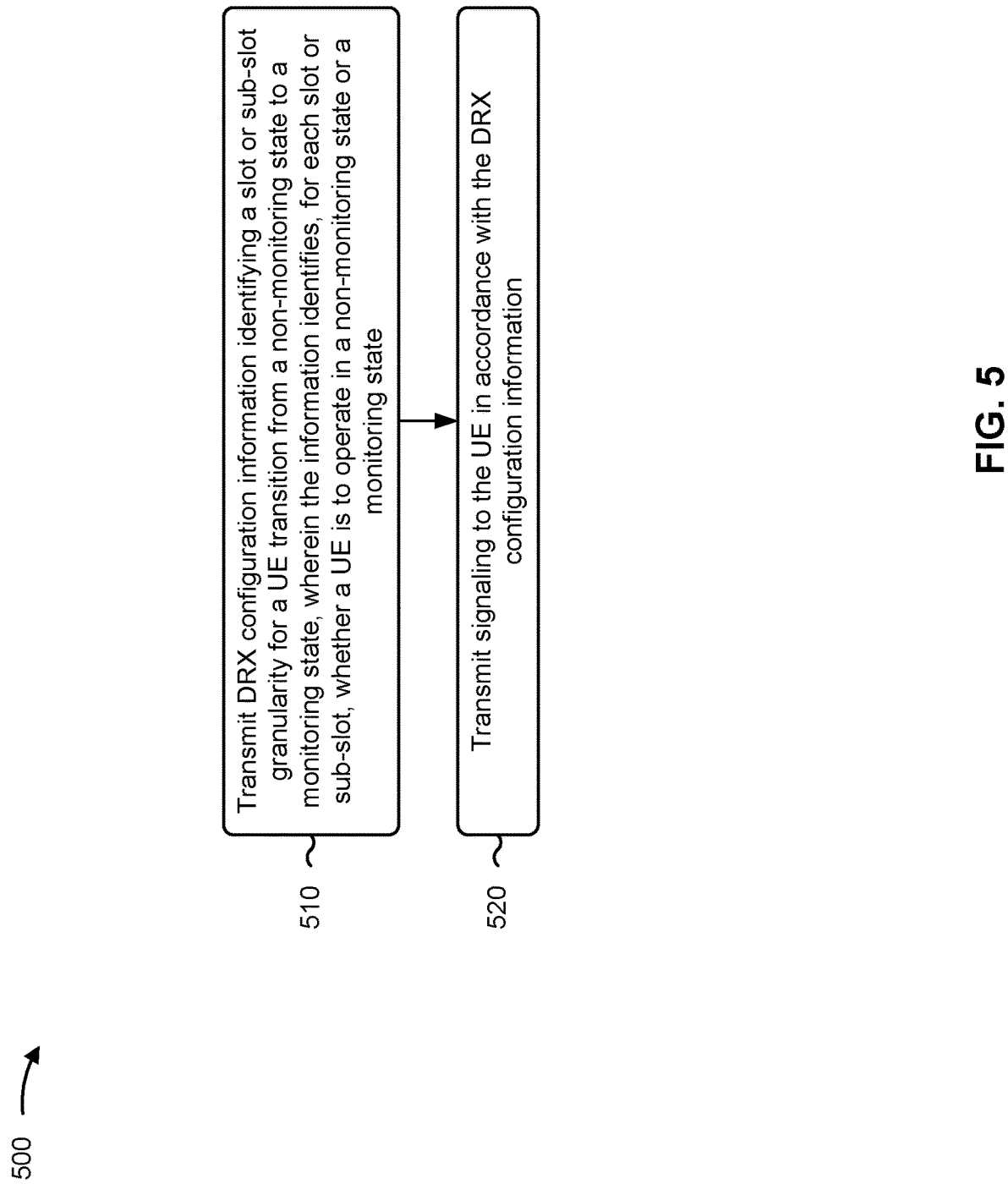

FIG. 5 is a diagram illustrating an example process 500 performed, for example, by a base station, in accordance with the present disclosure. Example process 500 is an example where the base station (e.g., base station 110) performs operations associated with flexible DRX configuration.

As shown in FIG. 5, in some aspects, process 500 may include transmitting DRX configuration information identifying a slot or sub-slot granularity for a UE transition from a non-monitoring state to a monitoring state, wherein the information identifies, for each slot or sub-slot, whether a UE is to operate in a non-monitoring state or a monitoring state (block 510). For example, the base station (e.g., using transmission component 704, depicted in FIG. 7) may transmit DRX configuration information identifying a slot or sub-slot granularity for a UE transition from a non-monitoring state to a monitoring state, wherein the information identifies, for each slot or sub-slot, whether a UE is to operate in a non-monitoring state or a monitoring state, as described above.

As further shown in FIG. 5, in some aspects, process 500 may include transmitting signaling to the UE in accordance with the DRX configuration information (block 520). For example, the base station (e.g., using transmission component 704, depicted in FIG. 7) may transmit signaling to the UE in accordance with the DRX configuration information, as described above.

Process 500 may include additional aspects, such as any single aspect or any combination of aspects described below and/or in connection with one or more other processes described elsewhere herein.

In a first aspect, the DRX configuration information includes information identifying a first slot or sub-slot granularity for a first serving cell or bandwidth part and a second slot or sub-slot granularity for a second serving cell or bandwidth part.

In a second aspect, alone or in combination with the first aspect, the DRX configuration includes information identifying the slot or sub-slot granularity for connected mode DRX or idle mode DRX.

In a third aspect, alone or in combination with one or more of the first and second aspects, the DRX configuration information is a bit map with a plurality of bits corresponding to a plurality of slots or sub-slots to identify the slot or sub-slot granularity.

In a fourth aspect, alone or in combination with one or more of the first through third aspects, the DRX configuration information is conveyed via at least one of a radio resource control message or a system information block message.

In a fifth aspect, alone or in combination with one or more of the first through fourth aspects, the DRX configuration information includes offset information identifying a start point for the slot or sub-slot granularity.

In a sixth aspect, alone or in combination with one or more of the first through fifth aspects, the DRX configuration information includes a bit indicator to indicate whether the UE is to monitor a PDCCH for at least one of a cell radio network temporary identifier, a paging radio network temporary identifier, or a search space associated with a bitmap of the DRX configuration information.

In a seventh aspect, alone or in combination with one or more of the first through sixth aspects, a monitoring period is based at least in part on a non-access stratum identifier.

In an eighth aspect, alone or in combination with one or more of the first through seventh aspects, the DRX configuration information includes a plurality of bit maps activated by an activation command transmitted in at least one of a physical downlink control channel message or a medium access control control element.

In a ninth aspect, alone or in combination with one or more of the first through eighth aspects, process 500 includes transmitting an explicit indication of whether to the UE is to receive downlink data in connection with the DRX configuration.

In a tenth aspect, alone or in combination with one or more of the first through ninth aspects, process 500 includes transmitting a wake-up signal indicating the UE transition from the non-monitoring state to the monitoring state in accordance with the DRX configuration information.

In an eleventh aspect, alone or in combination with one or more of the first through tenth aspects, the DRX configuration information includes a plurality of DRX configurations associated with a plurality of cells.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
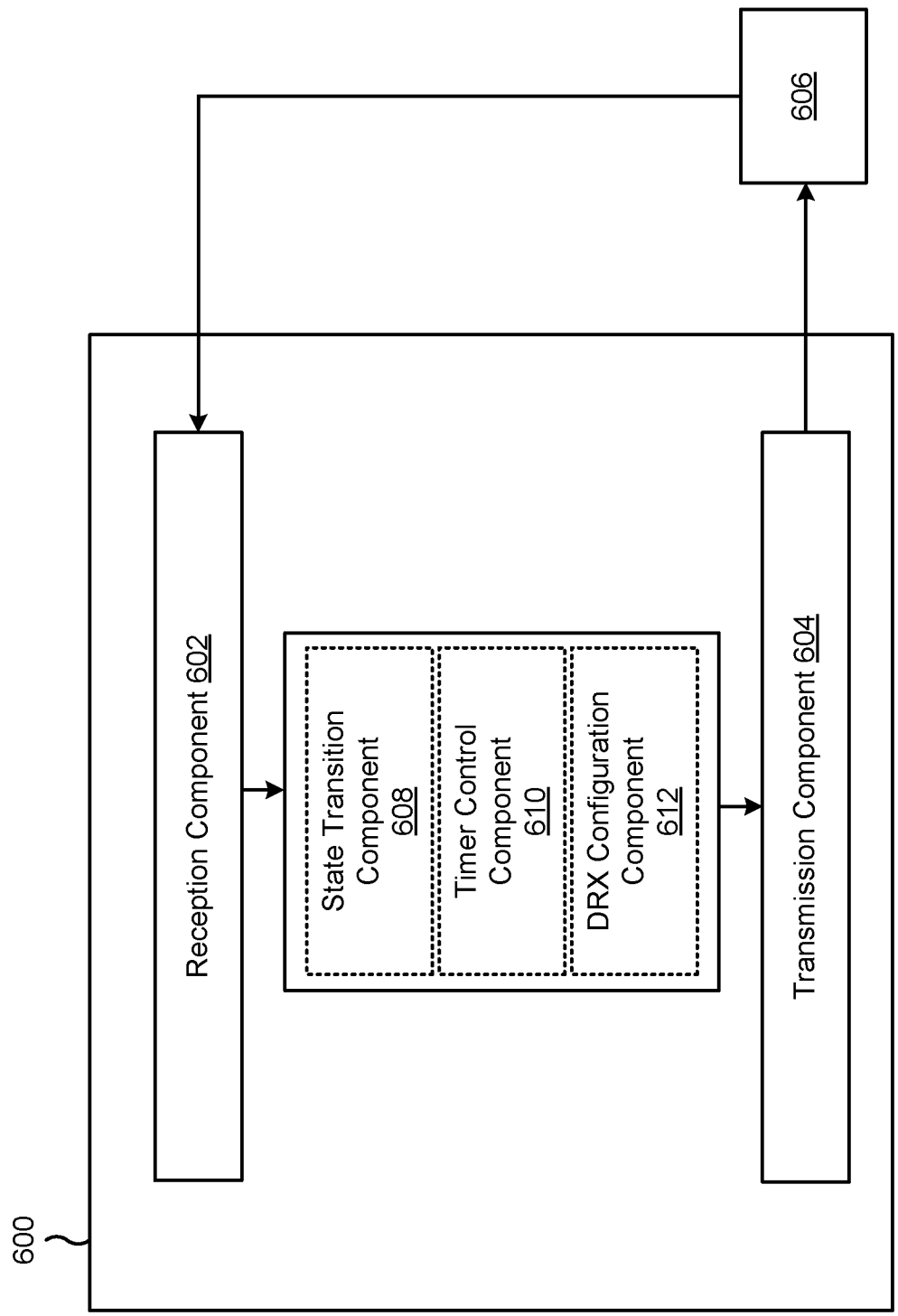
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a state transition component 608, a timer control component 610, or a DRX configuration component 612, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digitalto-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive DRX configuration information identifying a slot or sub-slot granularity for transitioning from a non-monitoring state to a monitoring state, wherein the information identifies, for each slot or sub-slot, whether to operate in a non-monitoring state or a monitoring state. The state transition component 608 may transition the apparatus 600 from the non-monitoring state, wherein the apparatus is not performing monitoring, to the monitoring state wherein the apparatus is performing monitoring, in accordance with the DRX configuration information.

The reception component 602 may receive, based at least in part on monitoring a physical downlink control channel in accordance with the DRX configuration, a downlink control information.

The timer control component 610 may start an inactivity timer associated with controlling whether to monitor for downlink data.

The reception component 602 may receive an explicit indication of whether to receive downlink data in connection with the DRX configuration.

The reception component 602 may receive a wake-up signal.

The reception component 602 may receive a channel access indication for shared spectrum.

The DRX configuration component 612 may activate a DRX configuration of the DRX configuration information based at least in part on receiving the channel access indication.

The DRX configuration component 612 may operate in accordance with a default configuration until receipt of the channel access indication.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
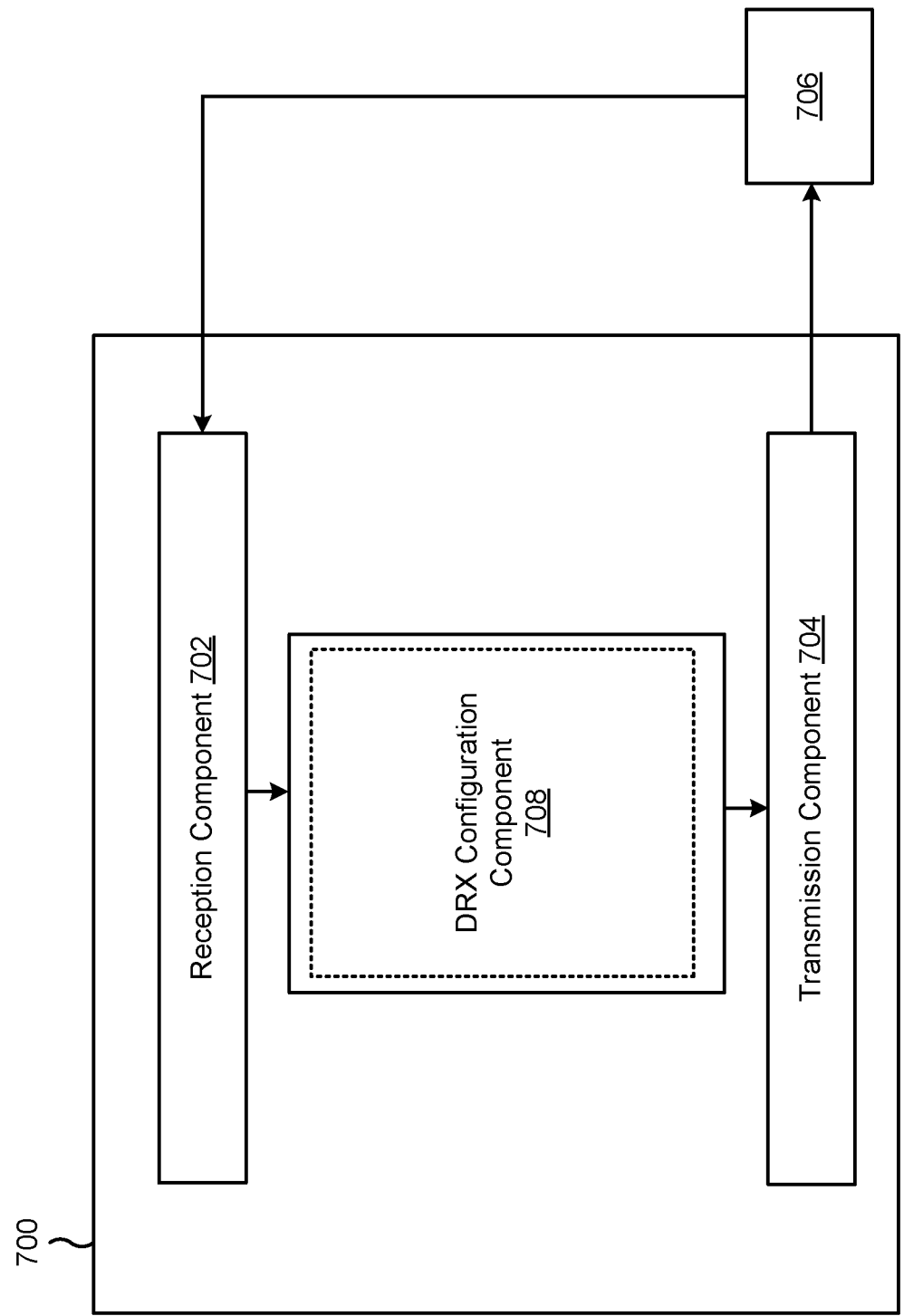

FIG. 7 is a block diagram of an example apparatus 700 for wireless communication. The apparatus 700 may be a BS, or a BS may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a DRX configuration component 708 among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the BS described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the BS described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the BS described above in connection with FIG. 2. In some aspects, the transmission component 704 may be co-located with the reception component 702 in a transceiver.

The transmission component 704 may transmit DRX configuration information identifying a slot or sub-slot granularity for a UE transition from a non-monitoring state to a monitoring state, wherein the information identifies, for each slot or sub-slot, whether a UE is to operate in a non-monitoring state or a monitoring state. The transmission component 704 may transmit signaling to the UE in accordance with the DRX configuration information.

The transmission component 704 may transmit an explicit indication of whether to the UE is to receive downlink data in connection with the DRX configuration.

The transmission component 704 may transmit a wake-up signal indicating the UE transition from the non-monitoring state to the monitoring state in accordance with the DRX configuration information.

The DRX configuration component 708 may determine a DRX configuration for a UE.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: receiving DRX configuration information identifying a slot or sub-slot granularity for transitioning from a non-monitoring state to a monitoring state, wherein the information identifies, for each slot or sub-slot, whether to operate in a non-monitoring state or a monitoring state; and transitioning from the non-monitoring state, wherein the UE is not performing monitoring, to the monitoring state wherein the UE is performing monitoring, in accordance with the DRX configuration information.

Aspect 2: The method of Aspect 1, wherein the DRX configuration information includes information identifying a first slot or sub-slot granularity for a first serving cell or bandwidth part and a second slot or sub-slot granularity for a second serving cell or bandwidth part.

Aspect 3: The method of any of Aspects 1 to 2, wherein the DRX configuration includes information identifying the slot or sub-slot granularity for connected mode DRX or idle mode DRX.

Aspect 4: The method of any of Aspects 1 to 3, wherein the DRX configuration information is a bit map with a plurality of bits corresponding to a plurality of slots or sub-slots to identify the slot or sub-slot granularity.

Aspect 5: The method of any of Aspects 1 to 4, wherein the DRX configuration information is conveyed via at least one of a radio resource control message or a system information block message.

Aspect 6: The method of any of Aspects 1 to 5, wherein the DRX configuration information includes offset information identifying a start point for the slot or sub-slot granularity.

Aspect 7: The method of any of Aspects 1 to 6, wherein the DRX configuration information includes a bit indicator to indicate whether to monitor a physical downlink control channel (PDCCH) for at least one of: a cell radio network temporary identifier, a paging radio network temporary identifier, or a search space associated with a bitmap of the DRX configuration information.

Aspect 8: The method of Aspect 7, wherein a monitoring period is based at least in part on a non-access stratum identifier.

Aspect 9: The method of any of Aspects 1 to 8, wherein the DRX configuration information includes a plurality of bit maps activated by an activation command received in at least one of a physical downlink control channel message or a medium access control control element.

Aspect 10: The method of any of Aspects 1 to 9, further comprising: receiving, based at least in part on monitoring a physical downlink control channel in accordance with the DRX configuration, a downlink control information; and starting an inactivity timer associated with controlling whether to monitor for downlink data.

Aspect 11: The method of any of Aspects 1 to 10, further comprising: receiving an explicit indication of whether to receive downlink data in connection with the DRX configuration.

Aspect 12: The method of any of Aspects 1 to 11, further comprising: receiving a wake-up signal; and wherein transitioning from the non-monitoring state to the monitoring state in accordance with the DRX configuration information comprises: transitioning from the non-monitoring state to the monitoring state in accordance with the DRX configuration information based at least in part on receiving the wake-up signal. wherein transitioning from the non-monitoring state to the monitoring state in accordance with the DRX configuration information comprises: transitioning from the non-monitoring state to the monitoring state in accordance with the DRX configuration information based at least in part on receiving the wake-up signal.

Aspect 13: The method of any of Aspects 1 to 12, further comprising: receiving a channel access indication for shared spectrum; and activating a DRX configuration of the DRX configuration information based at least in part on receiving the channel access indication.

Aspect 14: The method of Aspect 13, further comprising: operating in accordance with a default configuration until receipt of the channel access indication.

Aspect 15: The method of Aspect 14, wherein the default configuration includes one or more wake up periods.

Aspect 16: The method of any of Aspects 1 to 15, wherein the DRX configuration information includes a plurality of DRX configurations associated with a plurality of cells.

Aspect 17: A method of wireless communication performed by a base station, comprising: transmitting discontinuous reception (DRX) configuration information identifying a slot or sub-slot granularity for a user equipment (UE) transition from a non-monitoring state to a monitoring state, wherein the information identifies, for each slot or sub-slot, whether a UE is to operate in a non-monitoring state or a monitoring state; and transmitting signaling to the UE in accordance with the DRX configuration information.

Aspect 18: The method of Aspect 17, wherein the DRX configuration information includes information identifying a first slot or sub-slot granularity for a first serving cell or bandwidth part and a second slot or sub-slot granularity for a second serving cell or bandwidth part.

Aspect 19: The method of any of Aspects 17 to 18, wherein the DRX configuration includes information identifying the slot or sub-slot granularity for connected mode DRX or idle mode DRX.

Aspect 20: The method of any of Aspects 17 to 19, wherein the DRX configuration information is a bit map with a plurality of bits corresponding to a plurality of slots or sub-slots to identify the slot or sub-slot granularity.

Aspect 21: The method of any of Aspects 17 to 20, wherein the DRX configuration information is conveyed via at least one of a radio resource control message or a system information block message.

Aspect 22: The method of any of Aspects 17 to 21, wherein the DRX configuration information includes offset information identifying a start point for the slot or sub-slot granularity.

Aspect 23: The method of any of Aspects 17 to 22, wherein the DRX configuration information includes a bit indicator to indicate whether the UE is to monitor a physical downlink control channel (PDCCH) for at least one of: a cell radio network temporary identifier, a paging radio network temporary identifier, or a search space associated with a bitmap of the DRX configuration information.

Aspect 24: The method of Aspect 23, wherein a monitoring period is based at least in part on a non-access stratum identifier.

Aspect 25: The method of any of Aspects 17 to 24, wherein the DRX configuration information includes a plurality of bit maps activated by an activation command transmitted in at least one of a physical downlink control channel message or a medium access control control element.

Aspect 26: The method of any of Aspects 17 to 25, further comprising: transmitting an explicit indication of whether to the UE is to receive downlink data in connection with the DRX configuration.

Aspect 27: The method of any of Aspects 17 to 26, further comprising: transmitting a wake-up signal indicating the UE transition from the non-monitoring state to the monitoring state in accordance with the DRX configuration information.

Aspect 28: The method of any of Aspects 17 to 27, wherein the DRX configuration information includes a plurality of DRX configurations associated with a plurality of cells.

Aspect 29: An apparatus for wireless communication at a device, comprising a processor; memory coupled with the processor; and instructions stored in the memory and executable by the processor to cause the apparatus to perform the method of one or more Aspects of Aspects 1-16.

Aspect 30: A device for wireless communication, comprising a memory and one or more processors coupled to the memory, the memory and the one or more processors configured to perform the method of one or more Aspects of Aspects 1-16.

Aspect 31: An apparatus for wireless communication, comprising at least one means for performing the method of one or more Aspects of Aspects 1-16.

Aspect 32: A non-transitory computer-readable medium storing code for wireless communication, the code comprising instructions executable by a processor to perform the method of one or more Aspects of Aspects 1-16.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 34: An apparatus for wireless communication at a device, comprising a processor; memory coupled with the processor; and instructions stored in the memory and executable by the processor to cause the apparatus to perform the method of one or more Aspects of Aspects 17-28.

Aspect 35: A device for wireless communication, comprising a memory and one or more processors coupled to the memory, the memory and the one or more processors configured to perform the method of one or more Aspects of Aspects 17-28.

Aspect 36: An apparatus for wireless communication, comprising at least one means for performing the method of one or more Aspects of Aspects 17-28.

Aspect 37: A non-transitory computer-readable medium storing code for wireless communication, the code comprising instructions executable by a processor to perform the method of one or more Aspects of Aspects 17-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 17-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, from a network node, discontinuous reception (DRX) configuration information,
         wherein the DRX configuration information is associated with a bit map comprising a plurality of bits that each corresponds to a different slot or sub-slot and that each indicates whether to operate in a non-monitoring state or a monitoring state;
      receive, based at least in part on receiving the DRX configuration information, a channel access indication for shared spectrum;
      activate a DRX configuration of the DRX configuration information based at least in part on receiving the channel access indication; and
      transition, in accordance with the DRX configuration, from the non-monitoring state to the monitoring state or from the monitoring state to the non-monitoring state.

2. The UE of claim 1, wherein the plurality of bits includes a first bit, corresponding to a first slot or sub-slot for a first serving cell or bandwidth part, and a second bit, corresponding to a second slot or sub-slot for a second serving cell or bandwidth part.

3. The UE of claim 1, wherein the DRX configuration information is received when the UE is in a connected mode DRX or an idle mode DRX.

4. The UE of claim 1, wherein the DRX configuration information is the bit map.

5. The UE of claim 1, wherein the bit map is received via at least one of a radio resource control message or a system information block message.

6. The UE of claim 1, wherein the DRX configuration information includes offset information identifying a start point for the slot or sub-slot granularity.

7. The UE of claim 1, wherein the plurality of bits indicate whether to monitor a physical downlink control channel (PDCCH) for at least one of:
   a cell radio network temporary identifier,
   a paging radio network temporary identifier, or
   a search space associated with the bit map.

8. The UE of claim 7, wherein the monitoring state is associated with a monitoring period that is based at least in part on a non-access stratum identifier.

9. The UE of claim 1, wherein the bit map is activated, among a plurality of bit maps stored by the UE, by an activation command received in at least one of a physical downlink control channel message or a medium access control control element.

10. The UE of claim 1, wherein the one or more processors are further configured to:

receive, based at least in part on monitoring a physical downlink control channel in accordance with the DRX configuration information, a downlink control information; and
start an inactivity timer associated with controlling whether to monitor for downlink data.

11. The UE of claim 1, wherein the one or more processors are further configured to:
   receive an explicit indication of whether to receive downlink data in connection with the DRX configuration information.

12. The UE of claim 1, wherein the one or more processors are further configured to:
   receive a wake-up signal; and
   wherein the transitioning from the non-monitoring state to the monitoring state, or from the monitoring state to the non-monitoring state, is based at least in part on receiving the wake-up signal.

13. The UE of claim 1, wherein the one or more processors are further configured to:
   operate in accordance with a default configuration until receipt of the channel access indication.

14. The UE of claim 13, wherein the default configuration includes one or more wake up periods.

15. The UE of claim 1, wherein the DRX configuration information includes a plurality of DRX configurations associated with a plurality of cells.

16. A network node for wireless communication, comprising:
   a memory; and
   one or more processors, coupled to the memory, configured to:
      transmit, to a user equipment (UE), discontinuous reception (DRX) configuration information,
         wherein the DRX configuration information is associated with a bit map comprising a plurality of bits that each corresponds to a different slot or sub-slot and that each indicates whether the UE is to operate in a non-monitoring state or a monitoring state;
      transmit a channel access indication for shared spectrum associated with activating a DRX configuration of the DRX configuration information; and
      transmit, based at least in part on transmitting the channel access indication, signaling to the UE in accordance with the DRX configuration.

17. The network node of claim 16, wherein the plurality of bits includes a first bit, corresponding to a first slot or sub-slot for a first serving cell or bandwidth part, and a second bit, corresponding to a second slot or sub-slot for a second serving cell or bandwidth part.

18. The network node of claim 16, wherein the DRX configuration information is received when the UE is in a connected mode DRX or an idle mode DRX.

19. The network node of claim 16, wherein the DRX configuration information is the bit map.

20. The network node of claim 16, wherein the DRX configuration information is transmitted via at least one of a radio resource control message or a system information block message.

21. The network node of claim 16, wherein the DRX configuration information includes offset information identifying a start point for the slot or sub-slot granularity.

22. The network node of claim 16, wherein the plurality of bits indicate whether the UE is to monitor a physical downlink control channel (PDCCH) for at least one of:
   a cell radio network temporary identifier,
   a paging radio network temporary identifier, or a search space associated with the bit map.

23. The network node of claim 22, wherein the monitoring state is associated with a monitoring period that is based at least in part on a non-access stratum identifier.

24. The network node of claim 16, wherein the bit map is activated, among a plurality of bit maps stored by the UE, by an activation command received in at least one of a physical downlink control channel message or a medium access control control element.

25. The network node of claim 16, wherein the one or more processors are further configured to:
transmit an explicit indication of whether to the UE is to receive downlink data in connection with the DRX configuration information.

26. The network node of claim 16, wherein the one or more processors are further configured to:
transmit a wake-up signal associated with transitioning from the non-monitoring state to the monitoring state, or from the monitoring state or the non-monitoring state, in accordance with the DRX configuration information.

27. The network node of claim 16, wherein the DRX configuration information includes a plurality of DRX configurations associated with a plurality of cells.

28. A method of wireless communication performed by a user equipment (UE), comprising:
receiving, from a network node, discontinuous reception (DRX) configuration information,
wherein the DRX configuration information is associated with a bit map comprising a plurality of bits that each corresponds to a different slot or sub-slot and that each indicates whether to operate in a non-monitoring state or a monitoring state;
receiving a channel access indication for shared spectrum;
activating a DRX configuration of the DRX configuration information based at least in part on receiving the channel access indication; and
transitioning, in accordance with the DRX configuration, from the non-monitoring state to the monitoring state or from the monitoring state to the non-monitoring state.

29. A method of wireless communication performed by a network node, comprising:
transmitting, to a user equipment (UE), discontinuous reception (DRX) configuration information,
wherein the DRX configuration information is associated with a bit map comprising a plurality of bits that each corresponds to a different slot or sub-slot and that each indicates whether the UE is to operate in a non-monitoring state or a monitoring state;
transmitting a channel access indication for shared spectrum associated with activating a DRX configuration of the DRX configuration information; and
transmitting, and based at least in part on transmitting the channel access indication, signaling to the UE in accordance with the DRX configuration.

30. The method of claim 28, wherein the plurality of bits includes a first bit, corresponding to a first slot or sub-slot for a first serving cell or bandwidth part, and a second bit, corresponding to a second slot or sub-slot for a second serving cell or bandwidth part.

* * * * *